April 10, 1951     L. B. RIVARD ET AL     2,548,492
HOOD HINGE AND GUIDE MECHANISM Filed Dec. 15, 1945     3 Sheets—Sheet 1

L. B. Rivard
E. P. Rauh
INVENTORS.

E. C. McRae
BY R. G. Harris
J. R. Faulkner
ATTORNEYS.

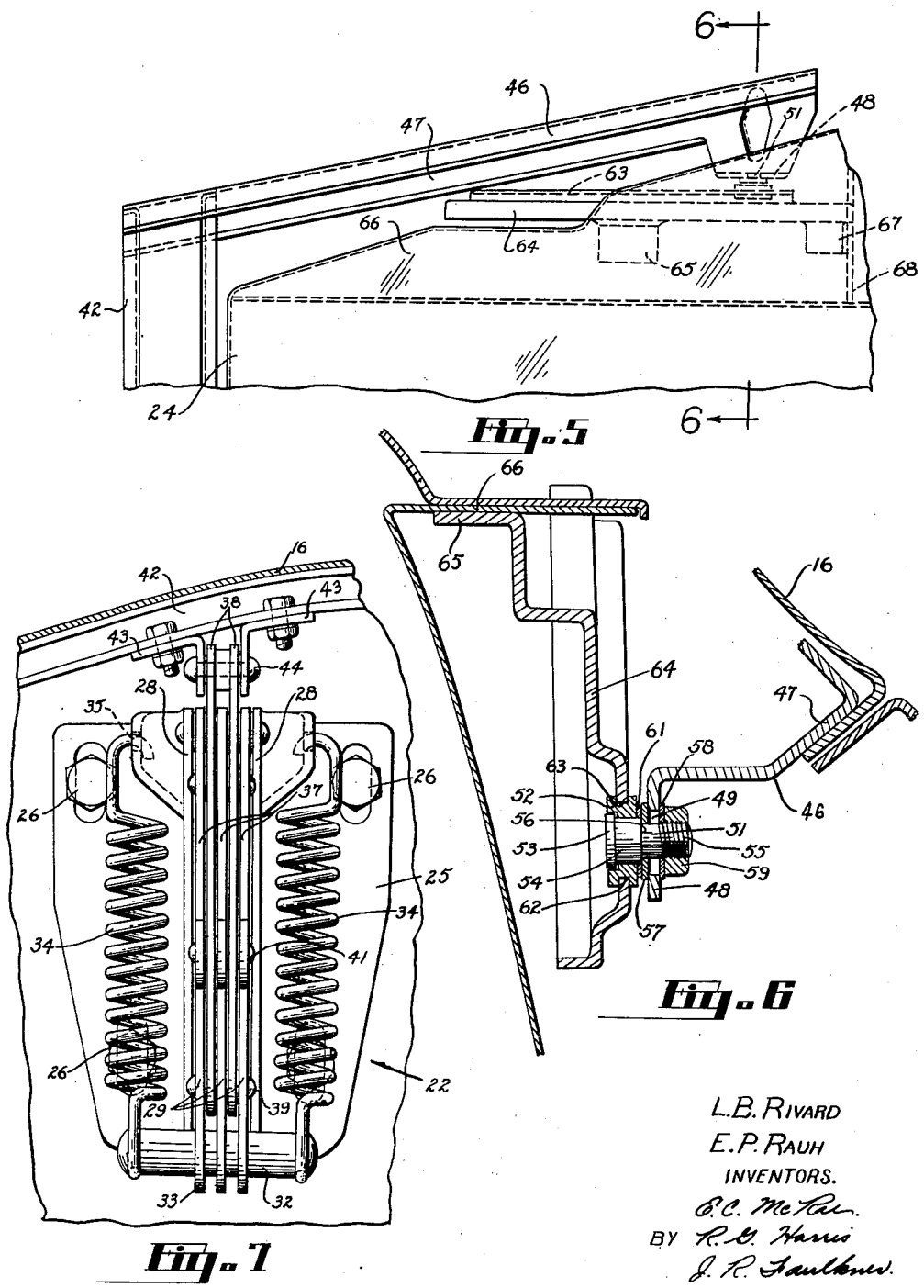

Patented Apr. 10, 1951

2,548,492

UNITED STATES PATENT OFFICE 2,548,492

HOOD HINGE AND GUIDE MECHANISM

Lawrence B. Rivard, Dearborn, and Ervin P. Rauh, Wixom, Mich., assignors to Ford Motor Company, Dearborn, Mich., a corporation of Delaware Application December 15, 1945, Serial No. 635,160

10 Claims. (Cl. 180—69)

This invention relates generally to a hood construction for a motor vehicle.

An object of the present invention is to provide an easily operated and positively controlled hood construction of the type in which the hood for the engine compartment of a vehicle opens upwardly about a rearwardly located pivot.

Another object of the invention is to provide a hood construction for the engine compartment of a vehicle in which the forward portion of the hood moves upwardly to open position in a substantially vertical path, facilitating the latching of the hood when the latter is closed.

The present trend in the design of motor vehicle bodies is such that the hood for the engine compartment has a pair of side flanges on opposite sides of the hood extending rearwardly a substantial distance along the vehicle body. Difficulty has heretofore been encountered in controlling these rearwardly extending side flanges and in preventing the latter from becoming laterally displaced and marring the finish on adjacent portions of the body as the hood is opened and closed. This disadvantage is eliminated by the present invention in which generally longitudinally exending guide means are provided between the vehicle body and the rearwardly extending side flanges of the hood to positively guide the latter in a predetermined path during the opening and closing of the hood, and to prevent lateral displacement thereof.

Still another object is to provide an improved hinge for a vehicle hood, which is adapted to be mounted on the cowl of the vehicle and to move an intermediate portion of the hood upwardly in a substantially vertical direction. This is accomplished by providing a pair of laterally spaced hinges, each having a pair of forwardly extending arms pivotally connected at vertically spaced points to a bracket mounted on the cowl, and a lever pivotally connected at spaced points to the free ends of the arms and to an intermediate portion of the hood. The hinges are preferably constructed of a plurality of interleaved arms and levers to provide a stabilized construction eliminating lateral displacement of the hood during the opening and closing thereof.

A further object of the invention is to provide a hood construction in which hinges of the type briefly mentioned above are utilized for raising an intermediate portion of the hood, in combination with guide means provided between the vehicle body and the rearward portions of the hood for guiding the latter forwardly in a generally horizontal direction as the hood is being opened. Preferably, the guide means are inclined slightly upwardly in a forward direction and cooperate with the hinges in effecting a movement of the forward portion of the hood in a generally vertical direction and at an accelerated rate. In addition to thus cooperating with the hinges in opening the hood, the guide means effectively prevent undesired lateral displacement of the rearwardly extending side flanges of the hood.

Other objects and advantages of the invention will be made more apparent as this description proceeds, especially when considered in connection with the accompanying drawings, in which:

Figure 5 is an enlarged fragmentary plan view of a portion of Figure 2, illustrating more in detail the guide means between the vehicle body and the hood.

Figure 6 is a transverse cross-sectional view taken substantially on the line 6—6 of Figure 5.

Figure 7 is a front elevational view of one of the hinges.

Figure 1:
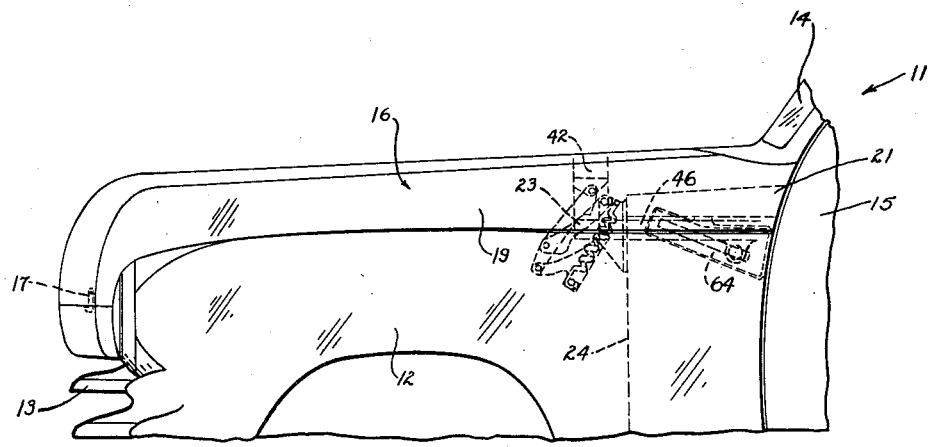
Figure 1 is a fragmentary side elevational view of a motor vehicle body having a hood construction embodying the present invention.
Figure 2:
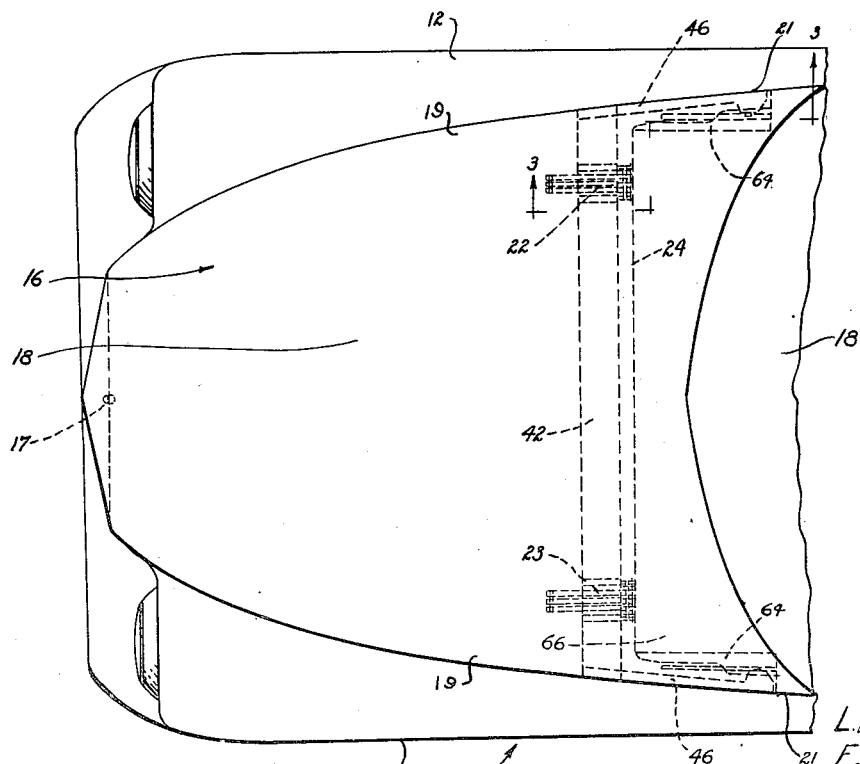
Figure 2 is a plan view of the construction shown in Figure 1.

Referring now more particularly to the drawings, there is shown in Figures 1 and 2 the forward portion of a motor vehicle body 11 including the usual fenders 12, radiator grille 13, windshield 14 and front door 15. A hood 16 forms a closure for the engine compartment and is of the type rearwardly mounted for upward swinging movement to an open position. A suitable latch 17 of conventional construction is provided between the forward portion of the hood 16 and the upper portion of the grille 13 to retain the hood in its closed position.

The hood 16 has a generally horizontal central section 18 and downwardly curved side sections 19 on opposite sides thereof, the latter terminating in side flanges 21 which extend rearwardly a substantial distance along the vehicle body.

Figure 3:
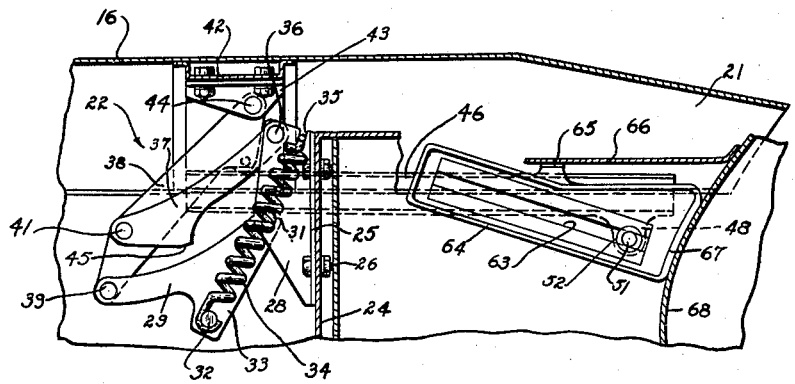
Figure 3 is an enlarged vertical cross-sectional view taken substantially on the line 3—3 of Figure 2.
Figure 4:
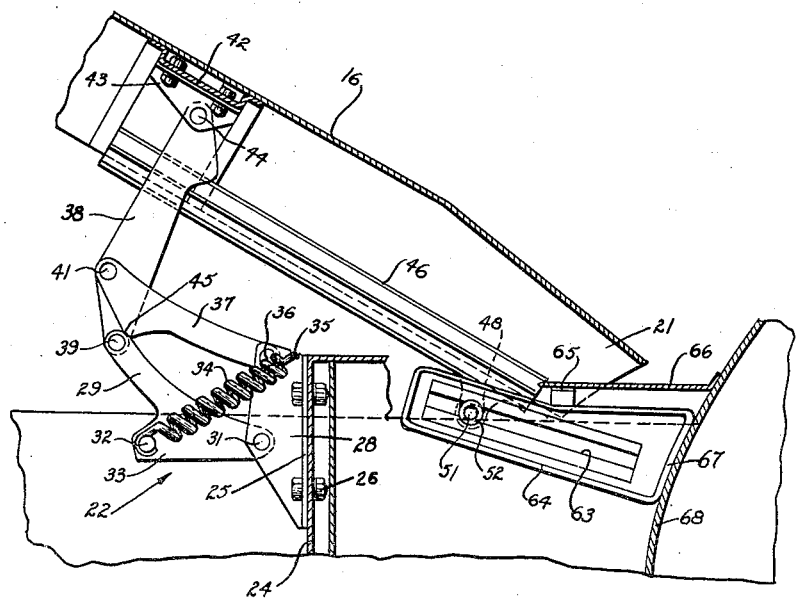
Figure 4 is a vertical cross-sectional view similar to Figure 3, but illustrating the hood in raised position.

A pair of hinges 22 and 23 are mounted upon the front cowl panel 24 of the vehicle body at laterally spaced points. The hinges 22 and 23 are identical in construction, and only hinge 22 will be described in detail. As seen in Figures 3, 4 and 7, hinge 22 has a supporting plate 25 mounted on the cowl panel 24 by means of bolts 26. Formed integrally with the plate, or secured thereto by any suitable means, are a pair of forwardly extending flanges 28, spaced from each other. Interleaved with the flange 28 is a group of three substantially identical arms 29 having their rearward ends pivotally connected to the flanges 28 by means of the pivot pin 31. A pin 32 extends through the downwardly depending portions 33 of the arms 29, and a pair of coil springs 34 are attached to opposite ends of the pin 33 and have their upper ends hooked in notches 35 formed in lateral extensions of the flanges 28. It will be noted from Figure 3 that the center line of the springs 34 is slightly to the left of pivot pin 31. The off-center springs thus give an upward impetus to the hood 16 when the latch 17 is released.

Spaced vertically above the group of arms 29, and pivotally connected to the flanges 28 by pivot pin 36, is a second group of three identical arms 37. A pair of identical levers 38 are interleaved between the free ends of the arms 29 and 37 and pivotally connected thereto at spaced points by pivot pins 39 and 41 respectively.

An inverted channel 42 extends transversely across the hood 16 and is welded to the under side thereof. A pair of downwardly depending angle brackets 43 are secured to the channel 42 vertically above each hinge. The upper ends of the levers 38 are pivotally connected by means of a pivot pin 44 to the angle brackets 43.

During the opening of the hood, the hinge 22 is extended from the position shown in Figure 3 to that shown in Figure 4, during which movement the arms 29 and 37 are swung upwardly, carrying with them levers 38. The relationship between the arms 29 and 37 and their respective pivotal connections with the flanges 28 and the levers 38 is such that the upper ends of the levers 38, carrying pivot pin 44, are moved upwardly in a generally vertical direction. Upward movement of the arms and levers is limited by the engagement of stops 45, provided on the arms 37, with the upper edges of arms 29. Springs 34 serve as a counterbalancing means to hold the hood in its raised position.

It will be noted that the connection between each hinge and the hood comprises a single pivot pin movable upwardly in a predetermined path, thus permitting pivotal movement of the hood about the pivot pin 44. To cooperate with the hinges in moving the hood between open and closed positions in a predetermined path and under a positive control, guide means are provided between the vehicle body and the rearwardly extending side flanges 21 of the hood.

The guide means include a guide roller support 46 secured to each of the rearwardly extending side flanges 21 of the hood. As best seen in Figure 6, the guide roller support has a flange 47 which is secured to the lower edge of the hood 16. In addition the guide roller support 46 is further supported at its forward end by attachment to the end of the inverted channel 42. Adjacent its rearward end, the flange 47 extends inwardly and terminates in a downwardly depending flange 48 provided with an elongated vertical slot 49 for receiving the stub shaft 51 upon which the guide roller 52 is mounted. With particular reference to Figure 6, it will be noted that the shaft 51 has an enlarged head 53, a shank 54 and a threaded portion 55 of reduced diameter. A shoulder 56 is thus formed between the shank 54 and the threaded portion 55 of the shaft. A pair of washers 57 and 58 are provided on shaft 51 on opposite sides of the flange 48, the latter being clamped between the washers by means of a nut 59. With washer 57 seated against shoulder 56, it will be apparent that shaft 51 is thus rigidly mounted upon the flange 48 of the guide roller support, but can be adjusted vertically in slot 49 if necessary for alignment purposes.

A bearing washer 61 is provided on the shank 54 of the shaft adjacent washer 57, and the construction is such that a predetermined amount of clearance is provided between the washer 61 and the guide roller 52, and between the guide roller and the head 53 of the shaft. This construction permits a limited axial movement of the guide roller on the shaft, compensating for irregularities and misalignments between the roller and the guide.

The outer periphery of the guide roller 52 is formed with an annular groove 62 engageable with the longitudinally extending track 63 formed in the guide 64. Guide 64 is rigidly mounted upon the vehicle body by means of a horizontal flange 65, suitably secured to the lower side of the top cowl panel 66, and by means of a vertical flange 67 which is secured to the door pillar 68 of the vehicle body.

It will be noted that a guide roller support and guide roller, similar to that described above, are provided upon the rearwardly extending side flange 21 at the opposite side of the hood, and that a track, similar to that described above, is carried by the vehicle body on the opposite side thereof for cooperation with the roller. Guide means are thus provided for each of the rearwardly extending side flanges 21 of the hood.

As the hood is moved upwardly by the hinges 22 and 23, the sliding engagement between the guide rollers 52, carried by the rearwardly extending side flanges of the hood, and the guides 64, mounted upon opposite sides of the cowl of the vehicle body, causes the rearward portion of the hood to be guided in a predetermined path, defined by the guides 64 which are inclined slightly upwardly in a forward direction. The arrangement is such that as the levers 38 of the hinge move the intermediate portion of the hood upwardly, the rearward portion thereof is moved generally forwardly and slightly upwardly, resulting in lifting the forward portion of the hood in a generally vertical direction and at an accelerated rate. In many vehicle hood constructions the forward portion of the hood has a considerable longitudinal movement during its closing stages interfering materially with the proper latching thereof. With this construction, however, the forward portion of the hood is moved substantially vertically and a simplified and easily operated latch can be used.

In addition, the rearwardly extending side flanges of the hood are restrained from lateral displacement and are positively guided in a predetermined path preventing obstruction between this portion of the hood and the adjacent surfaces of the vehicle body. Thus, the hinges and guide means described above cooperate to form an advantageous hood construction for a motor vehicle.

It will be understood that the invention is not to be limited to the exact construction shown and described, but that various changes and modifications may be made without departing from the spirit and scope of the invention, as defined in the appended claims.

What is claimed is:

1. In a hood construction for the engine compartment of a vehicle body, a closure for said compartment, said closure having rearwardly extending flanges on opposite sides thereof embracing the adjacent portions of the body, hinge means connecting said body and said closure for moving the latter upwardly in a predetermined path, said hinge means being disposed forwardly of but adjacent to the rear end of said closure, cooperating guide means on said body and said rearwardly extending flanges guiding said flanges away from the adjacent portions of the body in predetermined paths generally forwardly and upwardly as said closure is moved upwardly.

2. In a hood construction for the engine compartment of a vehicle body, a closure for said compartment, said closure having rearwardly extending flanges on opposite sides thereof, hinge means connecting said body and said closure in a transverse zone intermediate the forward and rearward edges of said closure for guiding said intermediate portion upwardly in a predetermined path, a longitudinally extending guide mounted on each side of said vehicle body adjacent the rearwardly extending flanges of said closure, said guides being inclined upwardly toward their forward ends, and studs carried by said flanges and slidably received in said guides.

3. In a hood construction for the engine compartment of a vehicle body, a closure for said compartment, said closure having a generally horizontal central portion and generally vertical side portions on each side of said control portion with the side portions having flanges extending beyond the rearward edge of said central portion, hinge means carried by said body and connected to the central portion of said closure and guiding said central portion upwardly in a predetermined path, upwardly inclined longitudinally extending guides mounted on opposite sides of said body adjacent the rearwardly extending flanges of said side portions, and studs carried by said flanges and slidably received within said guides.

4. A mounting for a vehicle hood construction comprising hinge means mounted on said vehicle and pivotally connected to an intermediate portion of said hood and adapted to guide that portion of the hood generally vertically upwardly in a predetermined path, a guide member rigidly mounted upon said vehicle, and a cooperating guide member upon said hood slidably engaging said first guide member to guide said hood in a generally longitudinal path to effect a generally vetrical movement of the forward portion of said hood at an accelerated rate.

5. A mounting for a vehicle hood construction comprising hinge means mounted on said vehicle and including a pair of generally parallel pivotally mounted arms and a single lever arm pivotally connected at spaced points to said arms and to an intermediate portion of said hood and forming the sole connection between said arms and said hood and adapted to guide that portion of said hood generally vertically upwardly in a predetermined path, and guide means between said vehicle and a rearward portion of said hood, said guide means extending longitudinally and being inclined upwardly in a forward direction.

6. A mounting for a vehicle hood construction comprising a pair of transversely spaced hinges each including a bracket mounted on said vehicle, a pair of spaced arms pivotally connected at their rearward ends to said bracket, a lever connected at spaced points to the free ends of said arms and to an intermediate portion of said hood, and a spring connected between said bracket and one of said arms, a pair of longitudinally extending guides carried by said vehicle adjacent the rearward portion of said hood, said guides being inclined slightly upwardly in a forward direction, and studs carried by said hood adjacent the rearward portion thereof slidably engaged in said guides and guiding the rearward portion of said hood in a predetermined path such that the forward portion of said hood is moved generally vertically upwardly at an accelerated rate.

7. In a hood construction for the engine compartment of a vehicle body, a closure for said compartment, a bracket mounted on said body, a pair of forwardly extending arms pivotally attached to said bracket at generally vertically spaced points, a single lever pivotally connected at spaced points to each of said arms and to said closure and guiding the portion of said closure connected thereto vertically in a predetermined path, said single lever being the sole connection between said arms and said closure, guide means mounted upon said body rearwardly of said bracket, and guide means carried by said closure adjacent the rearward edge thereof, said two guide means being slidably engaged with each other to guide the rearward edge of said closure in a generally horizontal direction as said arms and lever are being extended so that the forward part of said closure is swung upwardly.

8. In a hood construction for the engine compartment of a vehicle body, a closure for said compartment, hood support means interconnecting said closure and said body at a point intermediate the forward and rearward edges of said hood for guiding the intermediate portion of said closure upwardly in a predetermined path, and guide means for guiding the rearward portion of said closure in a predetermined path as the intermediate portion of said closure is moved upwardly.

9. In a hood construction for the engine compartment of a vehicle body, a closure for said compartment, hood support means interconnecting said closure and said body at a point intermediate the forward and rearward edges of said hood for guiding the intermediate portion of said closure upwardly in a predetermined path, and guide means for guiding the rearward portion of said closure in a predetermined path as the intermediate portion of said closure is moved upwardly, said guide means positively preventing lateral displacement of the closure relative to said body.

10. In a hood construction for the engine compartment of a vehicle body, a unitary closure for said compartment having rearwardly extending flanges on opposite sides thereof embracing the adjacent portions of said body, hinge means pivotally connecting said body and an intermediate portion of said closure for swinging said intermediate portion generally upwardly in a predetermined path, and cooperating guide means on said rearwardly extending flanges and the adjacent portions of said body guiding said flanges generally forwardly as the intermediate portion of said closure is moved upwardly to raise the forward portion of said unitary closure upwardly at an increased rate.

LAWRENCE B. RIVARD.
ERVIN P. RAUH.

(References on following page)

REFERENCES CITED

The following references are of record in the file of this patent:

UNITED STATES PATENTS

| Number | Name | Date |
|---|---|---|
| 2,131,116 | Northup | Sept. 27, 1938 |
| 2,162,135 | Tell | June 13, 1939 |
| 2,197,648 | Mersheimer | Apr. 16, 1940 |
| 2,215,363 | Rupple et al. | Sept. 17, 1940 |
| 2,215,606 | Dunn | Sept. 24, 1940 |
| 2,348,348 | Krause | May 9, 1944 |
| 2,353,175 | Marple | July 11, 1944 |
| 2,410,734 | Hitzelberger | Nov. 5, 1946 |

FOREIGN PATENTS

| Number | Country | Date |
|---|---|---|
| 253,070 | Germany | May 11, 1911 |
| 316,792 | Great Britain | Aug. 8, 1929 |